A. VAN BRUNT.
GLASS FOR WATER GAGES.
APPLICATION FILED AUG. 20, 1912.
1,059,580.
Patented Apr. 22, 1913.
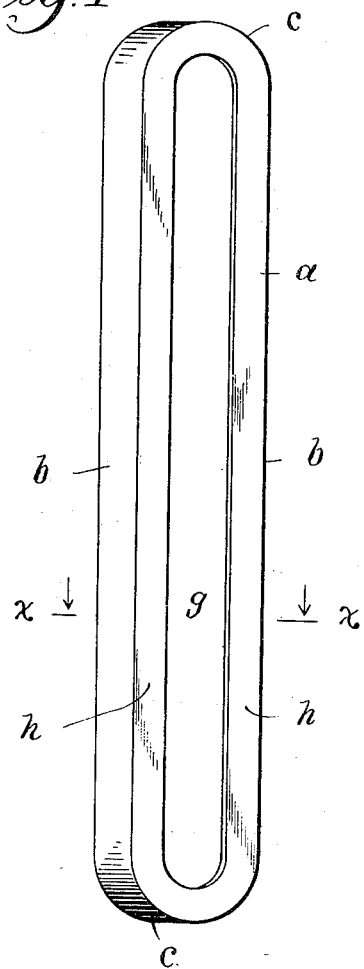
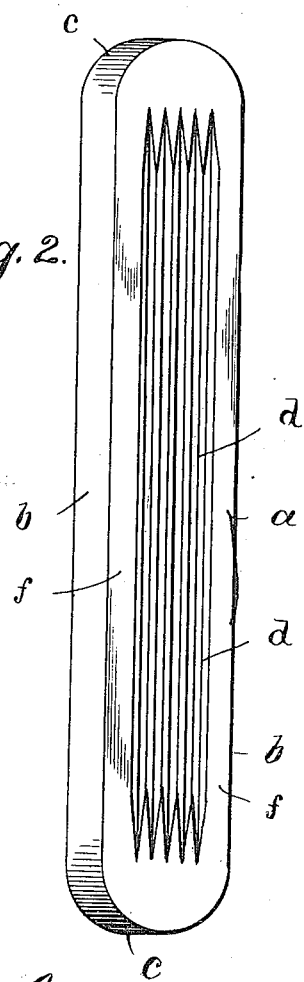
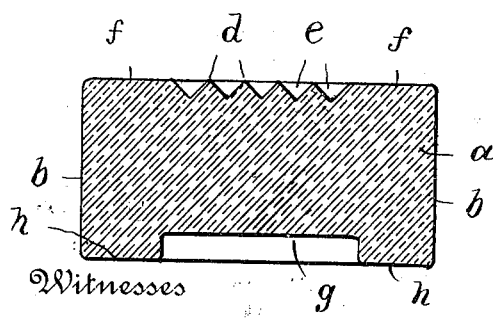
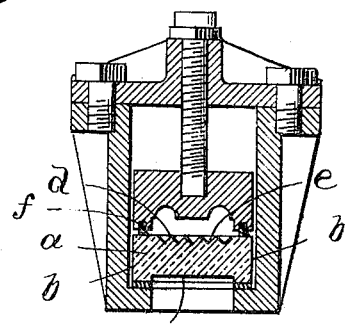
Witnesses
Natalie Newman
Ivan L. Morehouse
Inventor
Abram Van Brunt
By Chamberlain & Newman
Attorneys

UNITED STATES PATENT OFFICE.

ABRAM VAN BRUNT, OF BRIDGEPORT, CONNECTICUT.

GLASS FOR WATER-GAGES.

1,059,580. Specification of Letters Patent. Patented Apr. 22, 1913.

Application filed August 20, 1912. Serial No. 715,969.

*To all whom it may concern:*

Be it known that I, ABRAM VAN BRUNT, citizen of the United States, and resident of Bridgeport, in the county of Fairfield and State of Connecticut, have invented certain new and useful Improvements in Glasses for Water-Gages, of which the following is a specification.

My invention relates to water gages for showing the water level in steam boilers and refers more particularly to a new form of glass therefor.

The present kinds of water gage glasses are very liable to break or become worn so that they require to be frequently replaced. They are therefore made from an exceptionally good grade of material, and are especially formed and shaped to meet the requirements of the various gages. This condition therefore means a big expense to keep the gages supplied with glasses, and therefore I find it particularly desirable to produce a design of glass which is well adapted for the several popular styles of gages, that can be manufactured at a lesser cost than others constructed in a different manner, and in a way which will insure a proper fitting of the glass within the parts of the gage. I have therefore designed a heavy elongated special form of glass, the peculiar construction of which enables me to manufacture them quickly and uniformly accurate and in a manner to warrant them properly fitting in the gage and so that they will better stand the work and last longer. The outer edges of the glass are ground to fit within the body of the water gage and whose rear surface is provided with a series of longitudinal V shaped ribs and grooves, to reflect the light through the glass, that extend parallel to the length of the gage; further to include a central longitudinal pocket having a smooth observing surface that is lower than the surrounding surface, through which the water in the gage may be viewed, and to grind and smoothly finish the surrounding surface against which the gasket or clamping plate of the gage is fitted.

With these and other objects in view, as will more fully appear as the description proceeds, the invention resides and consists in the particular form and construction of glass as hereinafter more specifically set forth and particularly pointed out in the appended claims.

Reference is herein made to the accompanying drawings forming a part of this specification, and upon which similar characters of reference will be found to designate like or corresponding parts throughout the several figures, and of which, Figure 1, shows a front perspective view of my improved form of water gage glass, the same being of a size adapted to fit in one of the smaller sizes of my gages. Fig. 2, is a rear perspective view of the same glass shown in Fig. 1. Fig. 3, is an enlarged cross section through the glass taken on line $x$—$x$ of Fig. 1, and, Fig. 4, shows a cross sectional view through my improved water gage and illustrating the use therein of one of my present forms of glass.

Referring in detail to the characters of reference marked upon the drawings $a$ represents the glass as a whole, which as will be noted is made in one piece, and is elongated in form to correspond with the length and size of the water gage and conditions which it is designed to meet. The glass has parallel side edges $b$—$b$ and rounded end portions $c$, all of which in practice are ground and finished to properly fit the shouldered recesses in body of the gage, in which it is to be placed. The back of the glass is plain, except the central portion, which is provided with a series of V shaped ribs $d$ and grooves $e$ that are clearly finished to better reflect the surface line of the water through the glass. This construction leaves a smooth flat face $f$ on the back of the glass surrounding the said elongated reflecting surface so as to insure a proper fitting of the glass to the back of the body of the gage.

In the original molding of the glass the front central portion $g$ is formed lower than the surrounding surface to produce an elongated central pocket in the face of the glass directly opposite the ribs and grooves in the back so that the height of the water may readily be reflected through the glass and observed through the sunken portion of the face. The surface $h$ of the face of the glass surrounding the pocket is ground down to form a finished front surface that is perfectly flat, true and smooth, better to be engaged by the gasket or plate of the gage thereby insuring a positively tight fit to prevent the breaking of the glass when clamped in position, or the leakage of steam and water therethrough when in use.

The forming of the pocket in the front of the glass enables me to directly run over and grind off or mill the surrounding surfaces h with a very simple form of milling device and by a direct passage of the glass under the grinders without scratching or marking the face g of the glass through which the water is to be observed, it being obvious that the grinding of the surface of the glass renders it dulled and difficult to see through it. Therefore, the importance of preserving the central portion of the glass clear and clean will be appreciated.

Having thus described my invention what I claim and desire to secure by Letters Patent is:—

1. An observation glass for water gages, comprising an elongated body having a series of longitudinal ribs and grooves formed in the central portion of one side, and a longitudinally disposed central pocket forming a clear observing surface formed in the other side of the glass directly opposite the said rib and groove portion.

2. A reflector glass for water gages, comprising an elongated body having a series of longitudinal ribs and grooves formed in the central portion of one side, a longitudinally disposed central pocket formed in the opposite side of the glass directly opposite the said ribs and grooves, and having a raised face of the glass surrounding the said pocket that is ground or finished to form a straight and flat surface.

Signed at Bridgeport in the county of Fairfield and State of Connecticut this 19th day of August A. D. 1912.

ABRAM VAN BRUNT.

Witnesses:
C. M. NEWMAN,
MINNIE ROBBINS.